May 7, 1963 G. ABRAHAM 3,089,039
MULTISTABLE CIRCUIT EMPLOYING DEVICES IN CASCADE CONNECTION TO PRODUCE A COMPOSITE VOLTAGE-CURRENT CHARACTERISTIC WITH A PLURALITY OF NEGATIVE RESISTANCE REGIONS
Filed May 25, 1960 3 Sheets-Sheet 1
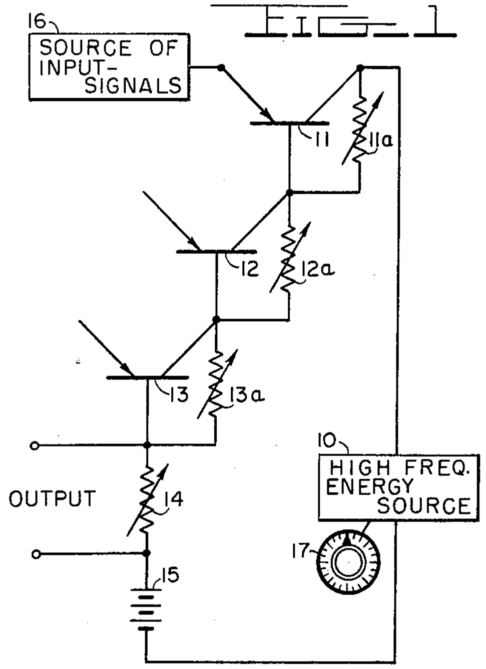
FIG. 2A
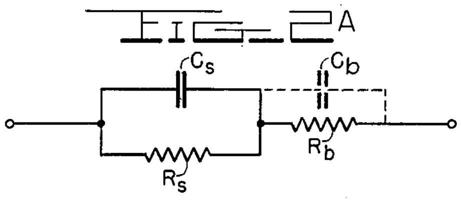
FIG. 2B
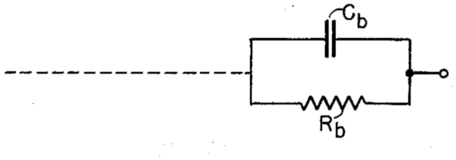
FIG. 2C
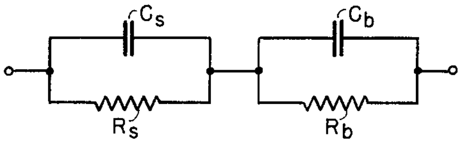
FIG. 3
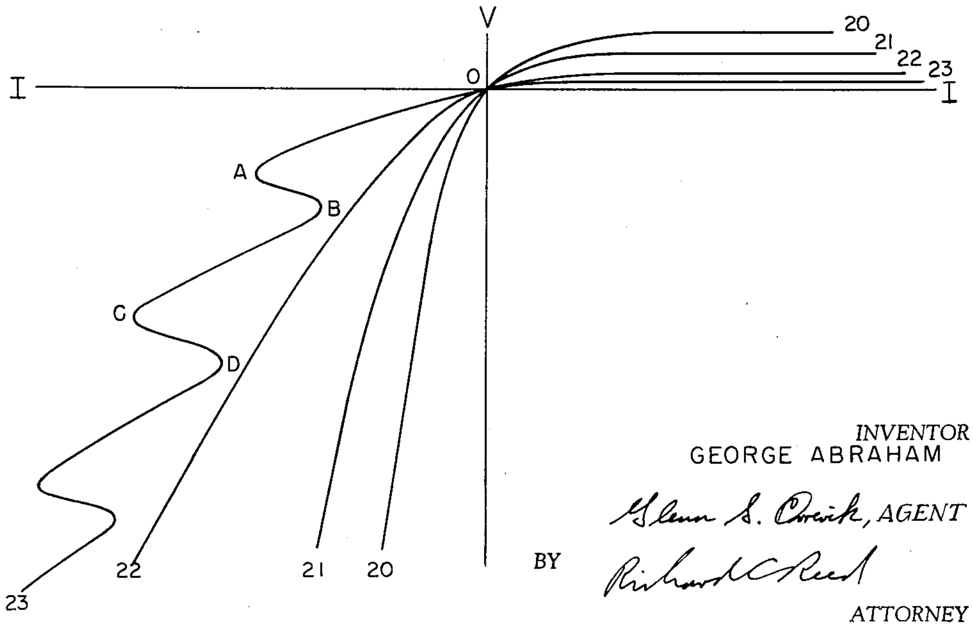
INVENTOR
GEORGE ABRAHAM
BY Glenn S. Orwick, AGENT
Richard C. Reed
ATTORNEY INVENTOR
GEORGE ABRAHAM
Glenn S. Ovrevik, AGENT
BY Richard C. Reed
ATTORNEY May 7, 1963 G. ABRAHAM 3,089,039

MULTISTABLE CIRCUIT EMPLOYING DEVICES IN CASCADE CONNECTION TO PRODUCE A COMPOSITE VOLTAGE-CURRENT CHARACTERISTIC WITH A PLURALITY OF NEGATIVE RESISTANCE REGIONS

Filed May 25, 1960 3 Sheets-Sheet 3

INVENTOR
GEORGE ABRAHAM

Glenn S. Orvick, AGENT

BY Richard C. Reed

ATTORNEY

United States Patent Office 3,089,039

Patented May 7, 1963

3,089,039

MULTISTABLE CIRCUIT EMPLOYING DEVICES IN CASCADE CONNECTION TO PRODUCE A COMPOSITE VOLTAGE-CURRENT CHARACTERISTIC WITH A PLURALITY OF NEGATIVE RESISTANCE REGIONS

George Abraham, 3107 Westover Drive SE., Washington, D.C.

Filed May 25, 1960, Ser. No. 31,788
7 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical signal translating circuits and in particular to multistable circuits.

This is a continuation in part of my application entitled Electrical Switching Circuit, Serial #629,762, filed December 20, 1956, now U.S. Patent No. 2,939,965.

In the field of electronics, a multistable circuit may find many useful applications. By way of example, in a counter, a plurality of multistable circuits, connected in tandem, may be used when it is desired to count pulses occurring either at regular intervals or at random. At present, counters employ conventional bistable circuits that have a number of disadvantages. For example, to obtain only two stable states, these circuits usually require a complicated arrangement using two transistors or two electron tubes. Thus, if several bistable circuits are utilized in a single counter, the physical size and weight of the counter will be appreciable. If electron tubes are used, the power consumption will be high and a large portion of the power supplied to the counter, because of the low efficiency, will be dissipated as heat.

In accordance with the foregoing, it is an object of the present invention to provide a multistable circuit having more than two stable states.

Another object of the present invention is to provide a multistable circuit employing a minimum number of circuit elements and requiring a negligible amount of power.

Another object of the present invention is to provide a multistable circuit whereby $n+1$ stable states may be obtained utilizing only $n$ variable impedance devices.

Another object of the present invention is to provide an electrical circuit having a voltage-controlled negative resistance curve with a plurality of stable states.

It is still another object of this invention to provide a multistable electrical circuit of the voltage-controlled negative resistance variety which may be triggered from one state to another utilizing a single load line.

An additional object of this invention is to provide a multistable circuit having more than one form of operation wherein the circuit may be triggered from one form of operation to another.

Other objects and many of the attendant advantages of this invention will be readily apparent as the same becomes better understood by reference to the following detailed description when considered in connection with the accompanying drawings wherein:

FIG. 1 discloses a typical embodiment of the present invention.

FIG. 2A represents the equivalent circuit of a transistor before dynamic B+ is applied, FIG. 2B represents the equivalent circuit during the applications of dynamic B+ and FIG. 2C represents the equivalent circuit immediately after the dynamic B+ has been removed from the transistor.

FIG. 3 represents negative resistance curves of the variable impedance devices in the circuit shown in FIG. 1.

Figures 4, 7, 8:
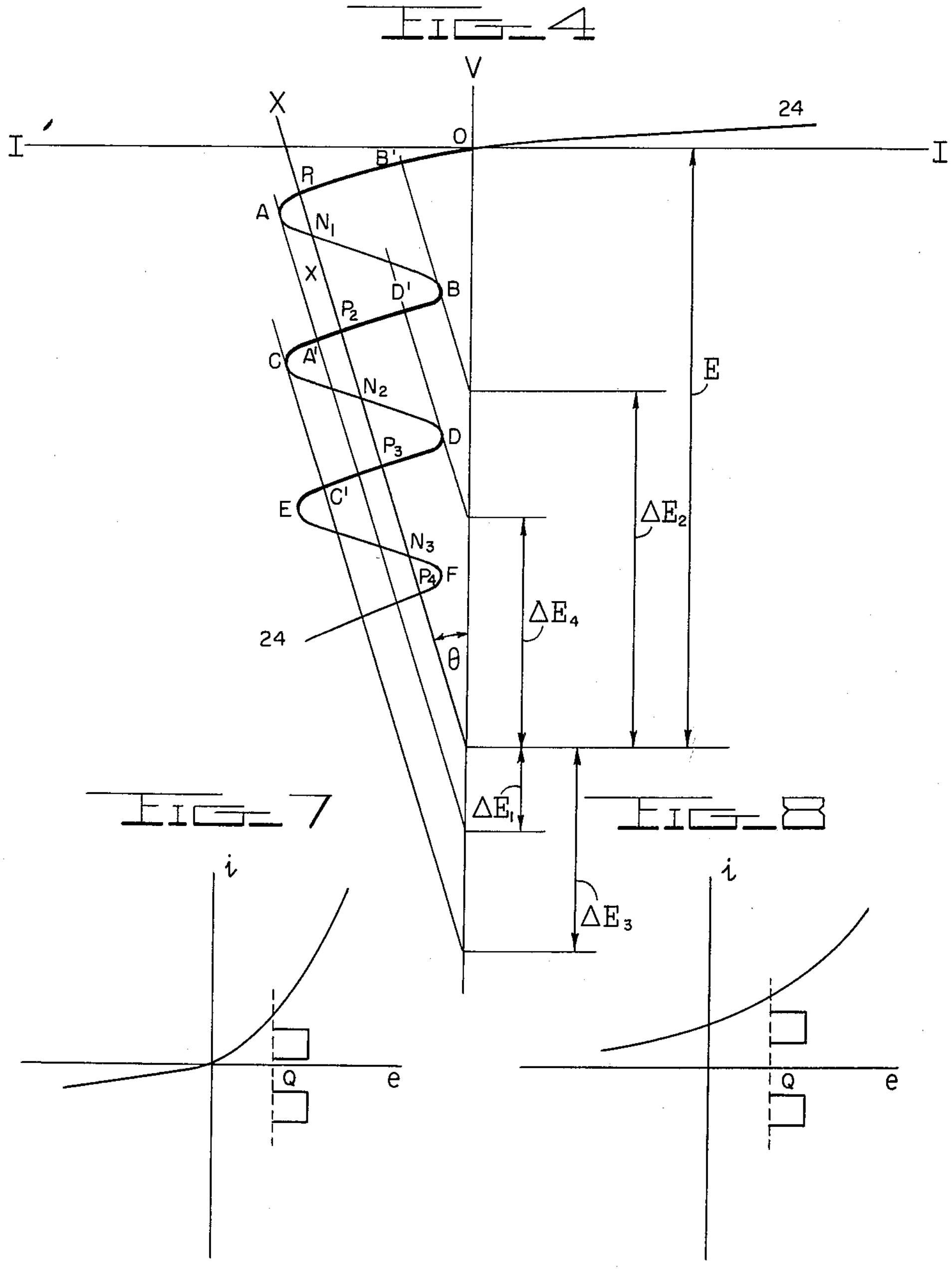
FIG. 4 represents a single load line drawn on one composite negative resistance curve of the variable impedance devices in the circuit shown in FIG. 1.
FIG. 7 shows the barrier resistance characteristic v. applied dynamic B+ curve of a transistor.
FIG. 8 shows the barrier capacitance characteristic v. applied dynamic B+ curve of a transistor.

As used in the present application, "dynamic B+" is defined as a periodically varying potential applied to a selected nonlinear device to store energy therein and to enable the device to function as an amplifier and/or to exhibit a negative resistance characteristic. As an example, a source of dynamic B+ may be a source of recurring signals having a frequency or repetition rate greater than the reciprocal of electrical charge carriers injected into the variable impedance device to which the source of dynamic B+ is connected.

In accordance with the present invention, a multistable circuit is provided wherein a plurality of devices each capable of exhibiting a short circuit stable type of negative resistance characteristic are connected in series across an output circuit such that negative resistance portions of the characteristic curve overlap at a selected current level and means are provided for increasing or decreasing the energy level in the series connection. In the illustrated embodiment, a high frequency energy source, known in the art as a source of dynamic B+, is connected in series with a plurality of variable impedance devices to inject electrical charge carriers into a plurality of variable impedance devices at a rate greater than the electrical charge carriers decay due to recombination to maintain a steady state of stored electrical charge carriers in the variable impedance devices. The stored electrical charge carriers are used to obtain a composite negative resistance curve having a plurality of regions in which stable states of operation may be located. The number of these stable regions will be one more than the number of variable impedance devices connected in series with the source of dynamic B+. The multistable circuit thus obtained may be triggered to a desired stable region in several ways such as by varying the relative amplitude, phase, or width of pulses applied to a selected element of the variable impedance devices or by varying the bias, or by varying the impedance load on the variable impedance devices, or by varying the frequency, amplitude or phase of the dynamic B+ applied to the variable impedance devices, etc. For example, triggering from a first stable region to a second stable region may be accomplished by applying a pulse of proper polarity and proper amplitude for a given load line to a desired element of a selected variable impedance device and a pulse of reverse polarity and proper amplitude will trigger the multistable circuit from the second to the first stable region.

Referring to FIG. 1, the typical embodiment of the multistable circuit shown comprises a high frequency energy source, or source of dynamic B+ 10 connected in series with variable impedance devices 11, 12 and 13, variable resistor 14, and a source of direct current voltage 15. Control knob 17, which is connected to source of dynamic B+ 10, may be employed to manually vary such parameter of the source of dynamic B+, as frequency, phase, duration and magnitude. The output of the multistable circuit may be connected across variable resistor 14 as shown. A source of input signals 16 is connected to a selected element of variable impedance device 11. It is, of course, understood that the source of input signals 16 could be connected, with proper polarity, to another element of variable impedance device 11 or to a desired element of variable impedance devices 12 and/or 13.

The variable impedance elements 11*a*, 12*a* and 13*a* are shown connected in shunt with the variable impedance devices 11, 12 and 13, respectively, for reasons which will become apparent hereinafter.

The variable impedance devices 11, 12 and 13 may be any devices capable of exhibiting a short circuit stable negative resistance characteristic, for example, semi-conductor devices such as diodes, transistor triodes, transistor tetrodes or photo transistors. The electrical charge carriers may be any positive or negative charges such as electrons, ions or holes. The dynamic B+ in the particular embodiment shown may be any source of recurring signals so long as the frequency or repetition rate of the recurring signals is greater than the reciprocal of the lifetime of injected electrical charge carriers and so long as one element of each variable impedance device is driven positive with respect to another element of the variable impedance device during each cycle of operation.

The variable impedances 11*a*, 12*a* and 13*a* may be considered as a part of the variable impedance devices 11, 12 and 13, respectively, for purposes of the operational discussion which follows:

In the present embodiment shown in FIG. 1, a regulated voltage square wave generator 10 is used as the high frequency energy source, the variable impedance devices 11, 12 and 13 are point contact transistors of N-type material, and therefore the injected electrical charge carriers are holes. It will be appreciated that other types of dynamic B+ could be used in combination with a selected variable impedance device to maintain a steady state of electrical charge carriers. For example, a high frequency, sine wave oscillator could be used to inject and store electrons in a tetrode transistor having a P-type base material.

In the operation of the multistable circuit shown in FIG. 1, the high frequency energy source 10 is applied to variable impedance devices 11, 12 and 13; and after a few cycles of operation, the number of holes stores in the variable impedance devices reach a steady state. Signals are then applied to the circuit via the selected element of variable impedance device 11 from the source of input signals 16 to trigger the multistable circuit to any one of a plurality of stable states.

In order to understand the operation of the multistable circuit shown in FIG. 1, it is necessary to appreciate the relationship between several factors that affect the number of holes stored in the steady state. When the variable impedance devices 11, 12 and 13 are N-type, point contact transistors, some of the factors to be considered may be listed as follows: the transistor impedance, the load impedance, the bias, and the parameters of the high frequency energy source such as frequency, magnitude, phase and duration.

Figure 6:
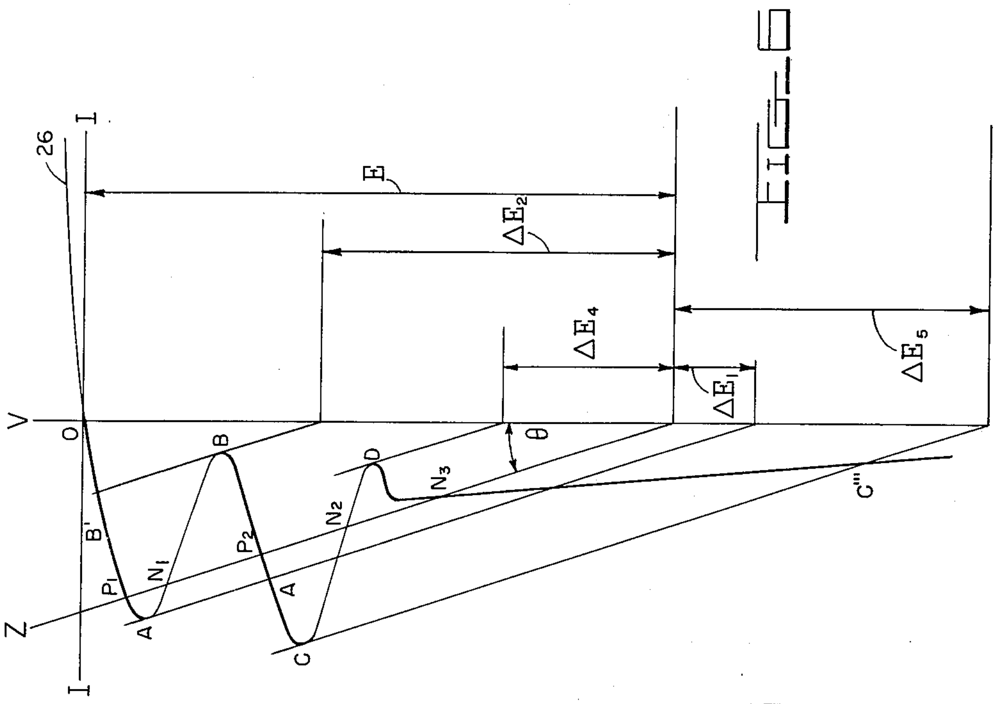
FIG. 6 represents a single load line drawn on still another composite negative resistance curve of the variable impedance devices in the circuit shown in FIG. 1.
Figure 5:
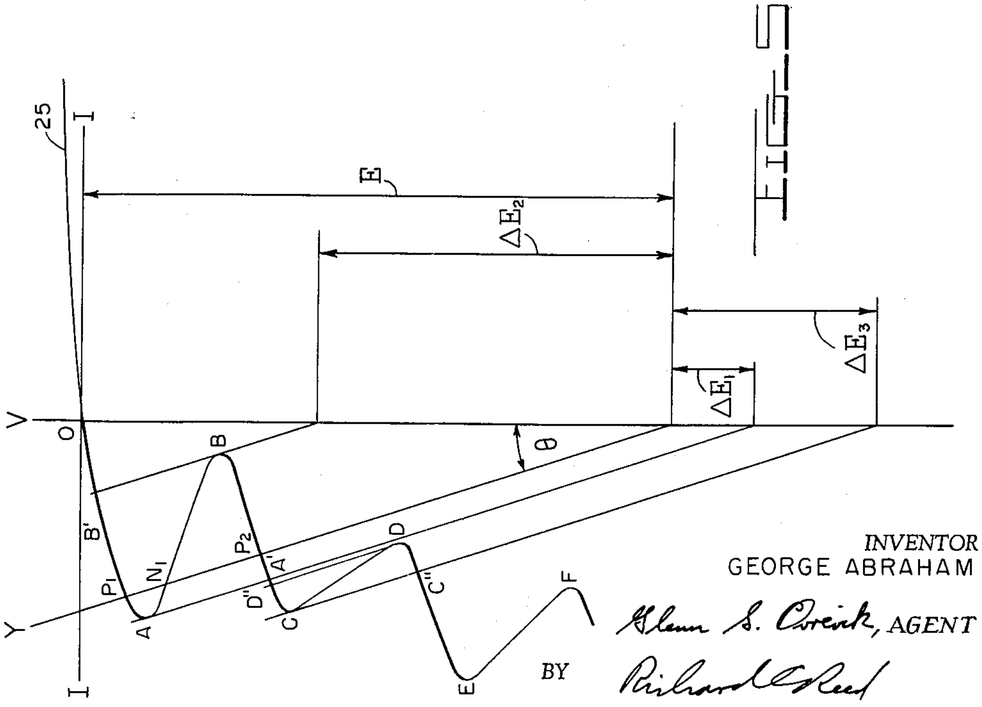
FIG. 5 represents a single load line drawn on another composite negative resistance curve of the variable impedance devices in the circuit shown in FIG. 1.

The curve 23 in FIG. 3 and the curves 24–26 in FIGS. 4–6, respectively, each depicts a composite voltage-current curve having a characteristic which is generally termed in the art as an S type, "voltage controlled" or "short circuit stable" negative resistance characteristic. For purposes of the present disclosure, the term "short circuit stable" is employed to define this type of negative resistance characteristic.

As indicated, the number of holes that will be stored in N-type base material of a point contact transistor will be determined in part by the internal impedance of the transistor, i.e., by the barrier capacitance, barrier resistance, base capacitance and base resistance of the transistor. As will be explained presently, the impedance of the transistor is not static but, rather, changes with changes in the energy level of the system in which it is employed.

The transistor impedance is dependent in part on such factors as the lifetime of the electrical charge carriers and diffusion length in the base material of the transistor. These factors in turn are determined by the material used and the process of manufacturing the transistor. The internal impedance is also dependent in part on the conditions under which the transistor is operated in a particular circuit. This will become apparent during the analysis of FIGS. 2A, 2B, and 2C which, it will be recalled, represent the equivalent circuit of a transistor before, during and immediately after the application of dynamic B+.

Referring to FIG. 2A, when no dynamic B+ is applied to a transistor, if the transistor is a point contact unit having N-type 5 ohm/cm. germanium base material, the value of the barrier capacitance $C_s$ will be approximately 3 $\mu\mu$f., the value of the barrier resistance $R_s$ will be approximately 5,000 ohms, the base capacitance $C_b$ will be less than 0.2 $\mu\mu$f. which normally may be neglected and the base resistance $R_b$ will be approximately 100 ohms. The value of each impedance will be determined in part by the material used and the process of manufacture of the point contact transistor.

In the preferred embodiment of the present invention a large magnitude of square wave dynamic B+ is applied to the transistor. As the dynamic B+ increases to its positive maximum value, there is considerable diffusion of electrical charge carriers into the base, and the value of the base capacitance $C_b$ becomes relatively large, approximately 350 $\mu\mu$f. The base resistance $R_b$ becomes smaller, approximately 60 ohms. As shown in FIG. 2B, these values cannot be neglected. The barrier capacitances $C_s$, because of the increased storage of electrical charge carriers, become larger, approximately 200 $\mu\mu$f., but the barrier resistance $R_s$ approaches zero, shunting out the increased barrier capacitance $C_s$. The barrier capacitance $C_s$ and barrier resistance $R_s$ may therefore, be neglected as shown in FIG. 2B.

As shown in FIG. 2C, when the dynamic B+ goes to zero, the barrier capacitance $C_s$ instantaneously returns from the larger value of 200 $\mu\mu$f. to to smaller value of 3 $\mu\mu$f. and the barrier resistance $R_s$ instantaneously returns from approximately zero to 100 ohms. The base resistance $R_b$, however, returns slowly from the smaller value of 60 ohms to the larger value of 100 ohms and the base capacitance $C_b$ returns slowly from the larger value of 350 $\mu\mu$f. to the smaller value of 0.2 $\mu\mu$f. Before the base capacitance $C_b$ can attain its smaller value, another pulse of dynamic B+ is applied to the transistor to return the base capacitance $C_b$ to its larger value. If a series of pulses are applied by the dynamic B+ to the transistor at a frequency greater than the reciprocal of the lifetime of the injected electrical charge carriers, after a few cycles of operation, the base capacitance $C_b$ will attain an average value. The number of electrical charge carriers stored in the base capacitance $C_b$ will, likewise, attain an average value or steady state that will be dependent in part upon the magnitude, duration, and frequency of the dynamic B+ applied to the transistor.

Referring to FIGS. 7 and 8, it is noted that the barrier capacitance and barrier resistance characteristic of a transistor (collector-base junction) are nonlinear and that the quiescent value of the barrier capacitance and resistance are dependent upon the bias applied to the transistor. As shown in FIGS. 7 and 8, when dynamic B+ is applied to the transistor, the barrier capacitance and barrier resistances vary in dependency upon the magnitude of the dynamic B+. These variations determine in part the magnitude of the steady state as explained in connection with FIGS. 2A, 2B and 2C.

The number of electrical charge carriers stored in the steady state is dependent in part upon the value of the load impedance and consequently may be varied by changing the value of load impedance. Hence, in FIG. 1, the magnitude of the steady state may be controlled, for example, by variable resistor 14.

The number of electrical charge carriers stored in the steady state will affect the shape of the composite voltage-current characteristic curve of variable impedance devices 11, 12 and 13 when the magnitude of the dynamic B+ applied to the transistors is zero. In FIG. 3, curve 21 represents the composite voltage-current characteristic when a relatively small magnitude of dynamic B+ is applied and curves 22 and 23 represent the voltage-current characteristic when the relative magnitude of dynamic B+ is increased, the magnitude of dynamic B+ applied to obtain curve 23 being greater than the magnitude applied to obtain curve 22. It is noted that as the magnitude of dynamic B+ is increased, the conductivity of variable impedance devices 11, 12 and 13 increases, i.e., the current flow through the variable impedance devices per unit of voltage applied, increases. This, in effect, is feedback which results in regeneration and is attributed to the storage of electrical charge carriers. Thus, in the circuit shown in FIG. 1, as the magnitude of the dynamic B+ is increased, the number of stored electrical charge carriers is increased and curve 20 assumes the position of curve 22.

Similar results could be obtained by maintaining the magnitude of the dynamic B+ constant and changing another factor that controls the number of minority electrical charge carriers stored, such as the duration or frequency of the dynamic B+.

In order to understand the shape of curve 23, it is necessary to bear in mind that the properties of the same type of transistor manufactured and formed of the same material and by the same process will vary slightly. The internal impedance and, therefore, the voltage across variable impedance devices 11, 12 and 13 connected in a series circuit will differ to some extent. It is noted that since variable impedance devices 11, 12 and 13 are connected in a series circuit, curve 23 is a composite voltage-current characteristic of the three variable impedance devices.

It should be noted that curve 23 depicts the selected case where the internal impedances of the transistors 11, 12 and 13 are substantially the same. Thus, the portion of curve 23 from 0 to B may be attributed primarily to the build-up of electrical charge carriers in variable impedance device 11 and the portion of curve from B to D may be attributed primarily to the build-up of electrical charge carriers in variable impedance device 12, etc. As the magnitude of the dynamic B+ applied to the circuit shown in FIG. 1 increases and the proportion of the voltage across variable impedance device 11 increases, regeneration causes a part of curve 22 to assume the position of portion 0A of curve 23. As the voltage across variable impedance device 11 increases further, regeneration is increased until with sufficient regeneration negative resistance appears in the vicinity of point A between A and B on the curve 23. Thereafter, increased voltage across variable impedance device 11 will form the negative resistance portions of curve 23. Essentially the same curve forming process will reoccur as the voltage across variable impedance device 12 increases to cause a part of curve 22 to assume the position of the portion CD of curve 23. Thus, it is seen that variable impedance devices 11, 12 and, likewise, 13 have in general different dynamic impedance levels.

The curve 23 in FIG. 3, the curve 24 in FIG. 4, the curve 25 in FIG. 7 and the curve 26 in FIG. 8 each depicts a composite voltage-current curve having a characteristic which is generally termed in the art as an S type, "voltage-controlled" or "short circuit stable" negative resistance characteristic. For purposes of the present disclosure, the term "short circuit stable" is employed to define this type of negative resistance characteristic.

Referring to FIG. 4, a composite voltage current characteristic curve of the multistable circuit shown in FIG. 1 is shown which is similar to curve 23 in FIG. 3 but differs in the relative position of the several portions thereof with respect to one another. In particular, the negative resistance regions A—B, C—D, E—F overlap at a selected current level. It has been found that by control of the relative internal impedances of the several devices 11, 12 and 13, by various techniques to be described hereinafter, the position of the portions of the composite voltage-current characteristic curve representative of the respective devices 11, 12 and 13 may be shifted such that negative resistance and positive resistance regions of each portion will overlap similar regions of the other portions and therefore may be intersected by a common positive resistance head. For example, it has been found that the assembly of selected devices 11, 12 and 13 having substantially identical internal impedances provides a composite voltage current characteristic curve such as shown in FIG. 3 wherein negative resistance regions do not overlap. By the assembly of selected devices 11, 12 and 13 having substantially nonidentical internal impedances, however, a composite voltage current characteristic curve of the type shown in FIG. 4 may be obtained.

It will be appreciated that in the present state of the art, a determination of the precise internal impedance of each of the devices 11, 12 and 13 prior to the assembly thereof would be costly and perhaps impractical on a mass production basis. However, relative internal impedances may be obtained by a variety of less costly standard laboratory techniques such as oscilloscope comparison of various devices under identical excitation conditions before the series assembly thereof or simple substitution of various devices in the series connection of FIG. 1 to obtain the proper combinations which affords a characteristic curve of the type shown in FIG. 4.

Alternatively, external means may be provided to control the effective internal impedances of the devices 11, 12 and 13. For example, resistive elements such as depicted in FIG. 1 (*11a*, *12a*, and *13a*) may be employed in shunt with each of the transistors 11, 12 and 13. Otherwise, in the case of transistors or other minority charge carrier devices of this variety, the source of dynamic B+ 10 may be replaced by individual sources of dynamic B+ applied across the devices 11, 12 and 13 and varied independently to alter the relative internal impedance thereof. In the case of transistors, individual variable D.C. sources, not shown, also may be utilized, by connection across the emitter-base, to vary the relative internal impedance (collector-base) of the devices 11, 12 and 13.

Likewise, it will be appreciated that devices of the tunnel diode variety, for example, which do not require the application of dynamic B+ for utilization of the device in the negative resistance region, may be substituted in place of the transistors 11, 12 and 13 in FIG. 1. In this instance the surplus source of dynamic B+ 10 may be eliminated, of course, and replaced either by a direct connection or by any other appropriate excitation means, if such is necessary.

It will be seen that the means for varying the internal impedance of the devices 11, 12 and 13 also is not critical to the invention and that a variety of different means may be employed for this purpose.

It will be noted that a single load line is drawn on each of the composite voltage current characteristic curves of 24, 25 and 26 of the multistable circuit shown in FIGS. 4, 5 and 6, respectively. Each of these load lines is drawn through a point on the voltage ordinate that is determined by the bias applied to variable impedance device 11 by the source of D.C. voltage 15 at an angle $\theta$ whose cotangent is equal to the sum of resistance 14 and the impedance of variable impedance devices 12 and 13, i.e., the sum of the impedance load on variable impedance device 11, assuming other impedances in the circuit, such as the impedance of the dynamic B+ are negligible. It will be noted that each of the load lines X, Y, and Z in FIGS. 4, 5 and 6, respectively, is shown intersecting the composite voltage-current characteristic curves 24, 25 and 26 at several points, in regions where the slope of the curve is negative as well as where the slope of the curve is positive. The points of intersection in the positive slope region $P_1$, $P_2$, $P_3$, etc., represent stable points of operation for the multistable circuit shown in FIG. 1. On the other hand, the points of intersection in the negative resistance region $N_1$, $N_2$, etc. (FIGS. 4 and 5), do not represent points of operation for values of load resistance greater than that of the negative resistance. As will be discussed hereinafter in connection with FIG. 6, the points of intersection in the negative resistance region $N_1$, $N_2$, etc., may be points of operation for values of load resistance less than the negative resistance.

In FIG. 4, the curve 24 is so adjusted relative to the load line X to permit bistable, tristable, etc., operation, depending upon the number of negative resistance regions available between selected levels, dependent upon the value and polarity of the input pulse signal applied to the circuit via the variable impedance device 11 by the source of input signals 16 in the embodiment of FIG. 1.

For purposes of this disclosure, the "value" of the input pulse signal is to be considered as a function of pulse magnitude and pulse width and the input signal is to be considered as the effective voltage applied across the series combination rather than the actual voltage applied to the emitter by source 16.

Considering bistable operation of the device of this invention under the conditions of characteristic curve 24, a normal bias voltage E maintains the device in a stable condition, for example, in its first stable region 0—$A_1$ at point $P_1$. Thereafter an input pulse from input source 16 of $\Delta E_1$ value and negative polarity with respect to bias voltage E will move the circuit to switching condition at point A whereupon switching to the next stable region B—C to point A', will suddenly occur.

After this pulse is applied the device will remain in the second stable region B—C, at $P_2$ (*a*) until an input pulse of value $\Delta E_2$ and of positive polarity is applied which will move the circuit to switching condition at point B whereupon switching to the first stable region 0—A to point B' will suddenly occur or (*b*) until an input pulse of value $\Delta E_3$ and of negative polarity is applied which will move the circuit to switching condition at point C whereupon switching to the third stable region D—E, to point C', will suddenly occur. Again the voltage E will maintain the circuit in its stable state at point $P_1$ of the region 0—A, or at point $P_3$ of the region D—E until another input pulse of selected value and polarity is applied.

In FIG. 5 the curve 25 is so adjusted relative to the load line Y to permit bistable operation in the first and second stable regions and to permit monostable operation in another region dependent upon the value and polarity of the voltage applied to the circuit via the variable impedance device 11 by the source of input signals 16 in the embodiment of FIG. 1.

Bistable operation in the first and second stable regions of characteristic curve 25 is identical with that just described in connection with characteristic curve 24. Since the load line Y does not intersect either the second negative resistance region or the third stable region, a different type of operation generally termed "monostable" occurs in the second and third stable regions BC and DE, respectively. Thus, when the device is being maintained in its second stable region B—C, at point $P_2$, by reason of the normal bias voltage E, and an input signal of value $\Delta E_3$ and of negative polarity is applied to the circuit, the device is moved to switching condition at point C whereupon switching to the third stable region D—E, to point C'', will suddenly occur. As long as the input signal remains, the device will stay in the third stable region at point C'' but as soon as the input signal is removed, the device moves to switching condition at point D whereupon switching to the second stable region B—C, to point D'', will suddenly occur. Again the voltage E will return and maintain the device in its second stable region B—C, at point $P_2$, until another input signal of selected value and polarity is applied to the circuit.

In FIG. 6, the curve 26 is so adjusted relative to the load line Z to permit bistable operation in the first and second stable regions and to permit astable operation in another region.

Again, the bistable operation in the first and second stable regions of characteristic curve 26 is identical with that described in connection with characteristic curve 24. In this instance the load line Z intersects the second negative resistance region at $N_2$, does not intersect the third stable region DE and intersects the third negative resistance region at $N_3$. Thus, when the device is being maintained in its second stable region B—C, at point $P_2$, by reason of the normal bias voltage E and an input pulse of value $\Delta E_5$ and negative polarity is applied to the circuit, the device is moved to switching condition at point C whereupon switching to the third negative resistance region, to point C''', will suddenly occur. At point C'', assuming sufficient reactance in the circuit, oscillation begins. It will be appreciated that for the short circuit stable type of negative resistance, the reactance in the circuit must be inductive. As long as the input signal remains, oscillation continues at point C''' and when the input signal is removed the normal bias voltage controls and oscillation continues at point $N_3$. Thereafter, an input pulse from input source 16 of value $\Delta E$ will move the circuit into the stable region D—E and into switching condition at point D whereupon switching to the next stable region B—C, to point D, will suddenly occur. Again the voltage E will maintain the circuit in stable region B—C, at point $P_2$, until another input pulse of selected value and polarity is applied.

While bistable operation involving switching between adjacent stable regions has been described in connection with FIGS. 4, 5 or 6, it will be appreciated that switching between other stable regions may be obtained, employing comparable circuitry, by the application of input pulse signals of greater value. In such instance, of course, a correspondingly greater output signal may be obtained.

For example, in FIG. 4, switching may be accomplished from point $P_1$ of the first stable region to point $P_3$ of the third stable region by the application of a pulse of negative polarity having a value $\Delta E_3$ and returned to point $P_1$ of the first stable region, if desired, by the application of a pulse of positive polarity having a value $\Delta E_2$. It will be appreciated that the pulse values listed above are the minimum values required for the switching actions and that the value of the pulse is not critical so long as it attains the required minimum and does not go above the minimum requirement for the next adjacent stable region.

It will be seen that by proper orientation of the characteristic curve relative to the load line, the input voltages $\Delta E_1$ and $\Delta E_2$, for example, may be of equal value such that a switching action for bistable operation may be obtained by a reversal of the polarity of the input signal. Likewise, by proper orientation, the negative input voltages $\Delta E_1$, $\Delta E_3$, etc., for example, may be in any selected relation such as $\Delta E_3 = n\,\Delta E_1$ or $\Delta E_3 = \Delta E_1 + nk$ where $n$ is an integer and $k$ is a constant.

Furthermore, the device of this invention may be triggered from one state to another by other means than the input pulse variation discussed above. For example, the device of this invention may be triggered by varying the slope of the load line, or by varying the frequency, phase or duration of the dynamic B+ applied to the individual variable impedance devices. Basically, any means for increasing or decreasing the energy of the system, electrical, optical, thermal or otherwise, may be employed to trigger the device of this invention.

By this invention, a new multistate circuit has been provided which in its multistable operation may be triggered from a first selected stable region to a second selected stable region by the application of a first input signal and from a second stable region to a third stable region by the application of a second input signal, ad infinitum. Thus, the device will produce an output representative of the input signal applied and may be employed as a pulse counter. In addition to its multistable operation, the device may be adapted for monostable or astable operation in conjunction therewith, if desired. As a result, a vastly more useful computer type operation may be obtained with a minimum number of circuit components.

Another feature of the device of this invention is in its variable input sensitivity. Dependent upon the location of the load line, the device may be employed in applications where, for example, either 1 millivolt or 1 volt input signal is available.

It should be understood, of course, that the foregoing disclosure relates to only a preferred embodiment of the present invention and that it is intended to cover all changes and modifications of the example of the invention herein chosen for the purposes of disclosure, which do not constitute departures from the spirit and scope of the invention.

What is claimed is:

1. An electrical circuit having a composite voltage-current characteristic with a plurality of negative resistance regions comprising a plurality of devices each having a significant internal impedance and each capable of exhibiting a negative resistance characteristic, output impedance means, means connecting said output impedance means and each of said plurality of devices in series, means connected to said electrical circuit for energizing said devices such that each of said devices has a negative resistance characteristic of the short circuit stable type, control means connected to said electrical circuit for biasing said devices for operation at selected points on said composite voltage-current characteristic and means for varying the effective internal impedance of said devices such that the relative internal impedances differ by an amount sufficient to provide a composite voltage-current characteristic having overlapping negative resistance regions at a selected current level.

2. The electrical circuit as defined in claim 1 wherein said means for varying the effective internal impedance of said devices is a plurality of means with each of the last said means individually connected in shunt with at least ($n-1$) of said devices where "$n$" is the number of devices in said plurality thereof.

3. The electrical circuit as defined in claim 2 wherein each of said plurality of means for varying the internal impedances of said devices includes a variable impedance element.

4. The electrical circuit as defined in claim 3 wherein said variable impedance element is a positive resistance.

5. The circuit as defined in claim 1 wherein said devices have negative resistance characteristics of semiconductors of the hole storage variety.

6. The circuit as defined in claim 1 wherein said devices have negative resistance characteristics of semiconductors of the tunnel diode variety.

7. An electrical circuit having a composite voltage-current characteristic with a plurality of negative resistance regions comprising a plurality of selected devices each having a significant internal impedance and capable of exhibiting a negative resistance characteristic, means connecting said plurality of devices in series, means connected to said devices for energizing said devices such that each of said devices has a negative resistance characteristic of the short circuit stable type and the relative internal impedances of said devices differ, said devices selected each with respect to the others in said plurality thereof such that the internal impedance characteristic of each device differs by an amount sufficient to provide a composite voltage-current characteristic having overlapping negative resistance regions at a selected current level when energized by said means for energizing.

References Cited in the file of this patent

UNITED STATES PATENTS

| | | |
|---|---|---|
| 2,614,140 | Kreer | Oct. 14, 1952 |
| 2,939,965 | Abraham | June 7, 1960 |

OTHER REFERENCES

1960 International Solid-State Circuits Conference, Session V Information Storage Techniques, by Lo, page 52 (Feb. 11, 1960).

Publication-Handbook of Semiconductor Electronics, Hunter, McGraw-Hill, 1956, pages 17–15 to 17–22.